United States Patent
Schilling

(10) Patent No.: US 7,580,475 B2
(45) Date of Patent: *Aug. 25, 2009

(54) BASE STATION HAVING A SET OF PHASED ARRAY ANTENNAS

(75) Inventor: Donald L. Schilling, Hoffstot Lane, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/106,853

(22) Filed: Apr. 21, 2008

(65) Prior Publication Data

US 2008/0192808 A1 Aug. 14, 2008

Related U.S. Application Data

(63) Continuation of application No. 10/427,173, filed on May 1, 2003, now Pat. No. 7,362,793, which is a continuation of application No. 10/087,091, filed on Feb. 28, 2002, now Pat. No. 6,563,860, which is a continuation of application No. 09/766,153, filed on Jan. 19, 2001, now Pat. No. 6,400,756, which is a continuation of application No. 09/280,328, filed on Mar. 29, 1999, now Pat. No. 6,256,340, which is a continuation of application No. 08/859,522, filed on May 20, 1997, now Pat. No. 5,926,502, which is a continuation of application No. 08/625,254, filed on Apr. 1, 1996, now Pat. No. 5,633,889, which is a continuation of application No. 08/266,769, filed on Jun. 28, 1994, now Pat. No. 5,659,572, which is a continuation-in-part of application No. 08/155,173, filed on Nov. 22, 1993, now Pat. No. 5,422,908.

(51) Int. Cl.
*H04L 27/00* (2006.01)

(52) U.S. Cl. .............. 375/295; 375/130; 375/136; 375/145; 375/147; 375/149

(58) Field of Classification Search ............ 375/130, 375/136, 145, 147, 149, 295
See application file for complete search history.

(56) References Cited

U.S. PATENT DOCUMENTS 4,097,804 A 6/1978 Yamaguchi (Continued)

FOREIGN PATENT DOCUMENTS

| EP | 0531028 | 3/1993 |
|---|---|---|
| GB | 2259430 A | 3/1993 |
| JP | S64-044662 | 2/1989 |
| JP | H04-185130 | 7/1992 |
| WO | 92/10890 | 6/1992 |

OTHER PUBLICATIONS

Compton, "An Adaptive Array in a Spread-Spectrum Communication System", Proceedings of the IEEE, vol. 66, No. 3, pp. 289-298, (Mar. 1978).

(Continued)

*Primary Examiner*—Curtis B Odom
(74) *Attorney, Agent, or Firm*—Volpe and Koenig, P.C.

(57) ABSTRACT

A spread spectrum base station for receiving a plurality of spread spectrum signals and a plurality of phased spread spectrum signals includes an antenna and a plurality of delay devices connected to the antenna, each delay device outputting a time-delayed spread spectrum signal. A combiner is connected to the plurality of delay devices for combining the time-delayed signals and the phased signals, the combiner outputting a combined signal. An RF/IF section is connected to the combiner and converts the combined signal into in-phase (I) components and quadrature-phase (Q) components. A plurality of despreaders are connected to the RF/IF section, each despreader despreading the I and Q components of the combined signal into a despread signal. A controller is connected to each of the despreaders and controls a corresponding delay device.

9 Claims, 4 Drawing Sheets

U.S. PATENT DOCUMENTS

| | | |
|---|---|---|
| 4,189,733 A | 2/1980 | Malm |
| 4,291,410 A | 9/1981 | Caples et al. |
| 4,361,891 A | 11/1982 | Lobenstein et al. |
| 4,549,303 A | 10/1985 | Gutleber |
| 4,587,661 A | 5/1986 | Schiff |
| 4,587,662 A | 5/1986 | Langewellpott |
| 4,608,701 A | 8/1986 | Burgers et al. |
| 4,800,390 A | 1/1989 | Searle |
| 5,062,148 A | 10/1991 | Edwards |
| 5,081,643 A | 1/1992 | Schilling |
| 5,101,501 A | 3/1992 | Gilhousen et al. |
| 5,107,273 A | 4/1992 | Roberts |
| 5,109,390 A | 4/1992 | Gilhousen et al. |
| 5,119,103 A | 6/1992 | Evans et al. |
| 5,138,650 A | 8/1992 | Stahl et al. |
| 5,248,982 A | 9/1993 | Reinhardt et al. |
| 5,260,968 A | 11/1993 | Gardner et al. |
| 5,402,450 A | 3/1995 | Lennen |
| 5,422,908 A | 6/1995 | Schilling |
| 5,425,059 A | 6/1995 | Tsujimoto |
| 6,006,113 A | 12/1999 | Meredith |
| 6,252,867 B1 | 6/2001 | Pfeil et al. |
| 6,256,340 B1 * | 7/2001 | Schilling ............... 375/148 |
| 6,400,756 B2 * | 6/2002 | Schilling ............... 375/148 |
| 6,563,860 B2 * | 5/2003 | Schilling ............... 375/148 |

OTHER PUBLICATIONS

Data Communication, Networks and Systems, Howard W. Sams & Co., 1987, pp. 343-352.

Digital Communications With Space Applications, S.W. Golomb et al., Prentice-Hall, Inc., 1964, pp. 45-64.

Naguib et al., "Perfomance of CDMA Cellular Networks with Base-Station Antenna Arrays: The Downlink", SUPERCOMM/ICC apos;94, Serving Humanity Through Communications, vol. 2, pp. 795-799, (May 1-5, 1994).

Sivanand, "On Adaptive Arrays in Mobile Communication," Commercial Applications and Dual Use Technology, Jun. 16-17, 1993, pp. 55-58.

Suard et al., "Performance of CDMA Mobile Communication Systems Using Antenna Arrays", Acoustics, Speech, and Signal Processing, ICASSP-1993, IEEE International Conference, 1993, vol. 4, Apr. 1993, pp. 153-156.

* cited by examiner

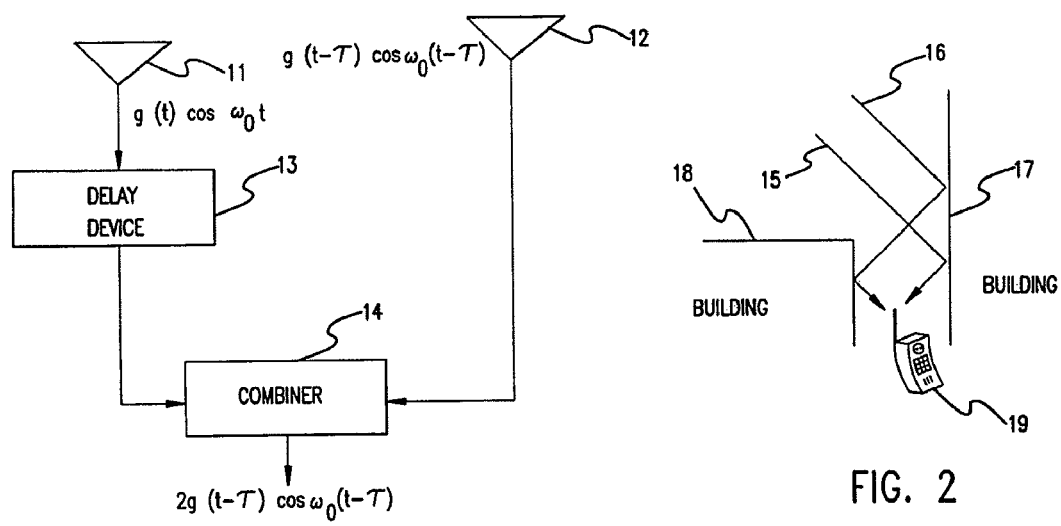

BASE STATION HAVING A SET OF PHASED ARRAY ANTENNAS

CROSS REFERENCE TO RELATED APPLICATIONS

This application is a continuation of U.S. patent application Ser. No. 10/427,173, filed May 1, 2003, now U.S. Pat. No. 7,362,793, which is a continuation of U.S. patent application Ser. No. 10/087,091, filed Feb. 28, 2002, now U.S. Pat. No. 6,563,860, which is a continuation of U.S. application Ser. No. 09/766,153, filed Jan. 19, 2001, now U.S. Pat. No. 6,400,756, which is a continuation of U.S. application Ser. No. 09/280,328, filed Mar. 29, 1999, now U.S. Pat. No. 6,256,340, which is a continuation of U.S. application Ser. No. 08/859,522, filed May 20, 1997, now U.S. Pat. No. 5,926,502, which is a continuation of U.S. application Ser. No. 08/625,254, filed Apr. 1, 1996, now U.S. Pat. No. 5,633,889, which is a continuation of U.S. application Ser. No. 08/266,769, filed Jun. 28, 1994, now U.S. Pat. No. 5,659,572, which is a continuation-in-part of U.S. application Ser. No. 08/155,173, filed Nov. 22, 1993, now U.S. Pat. No. 5,422,908, which applications are incorporated herein by reference.

BACKGROUND

The present invention relates to spread-spectrum communications and more particularly to a method and apparatus for enhancing communications by using phased array principles for increasing signal-to-noise ratio for a spread spectrum signal with multipath arriving at a receiver.

Achieving sufficient signal strength when a received signal comes from two paths is a problem when communicating with spread-spectrum modulation in a multipath environment. The received signal from the two paths may have phase cancellation, yielding no reception, or reception with an unacceptable error rate.

Phased arrays, as is well known in the art, require N antenna elements for distinguishing up to N−1 signals arriving at the phased array from different paths or directions. This concept of spatial diversity is well developed in antenna theory.

SUMMARY

A spread spectrum base station for receiving a plurality of spread spectrum signals and a plurality of phased spread spectrum signals includes an antenna and a plurality of delay devices connected to the antenna, each delay device outputting a time-delayed spread spectrum signal. A combiner is connected to the plurality of delay devices for combining the time-delayed signals and the phased signals, the combiner outputting a combined signal. An RF/IF section is connected to the combiner and converts the combined signal into in-phase (I) components and quadrature-phase (Q) components. A plurality of despreaders are connected to the RF/IF section, each despreader despreading the I and Q components of the combined signal into a despread signal. A controller is connected to each of the despreaders and controls a corresponding delay device.

BRIEF DESCRIPTION OF THE DRAWINGS

The accompanying drawings, which are incorporated in and constitute a part of the specification, illustrate preferred embodiments of the invention, and, together with the description, serve to explain the principles of the invention.

FIG. 1 is a block diagram illustrating the general concept of the invention;

FIG. 2 shows two multipath signals being received by a user;

DETAILED DESCRIPTION OF THE PREFERRED EMBODIMENTS

Figure 3:
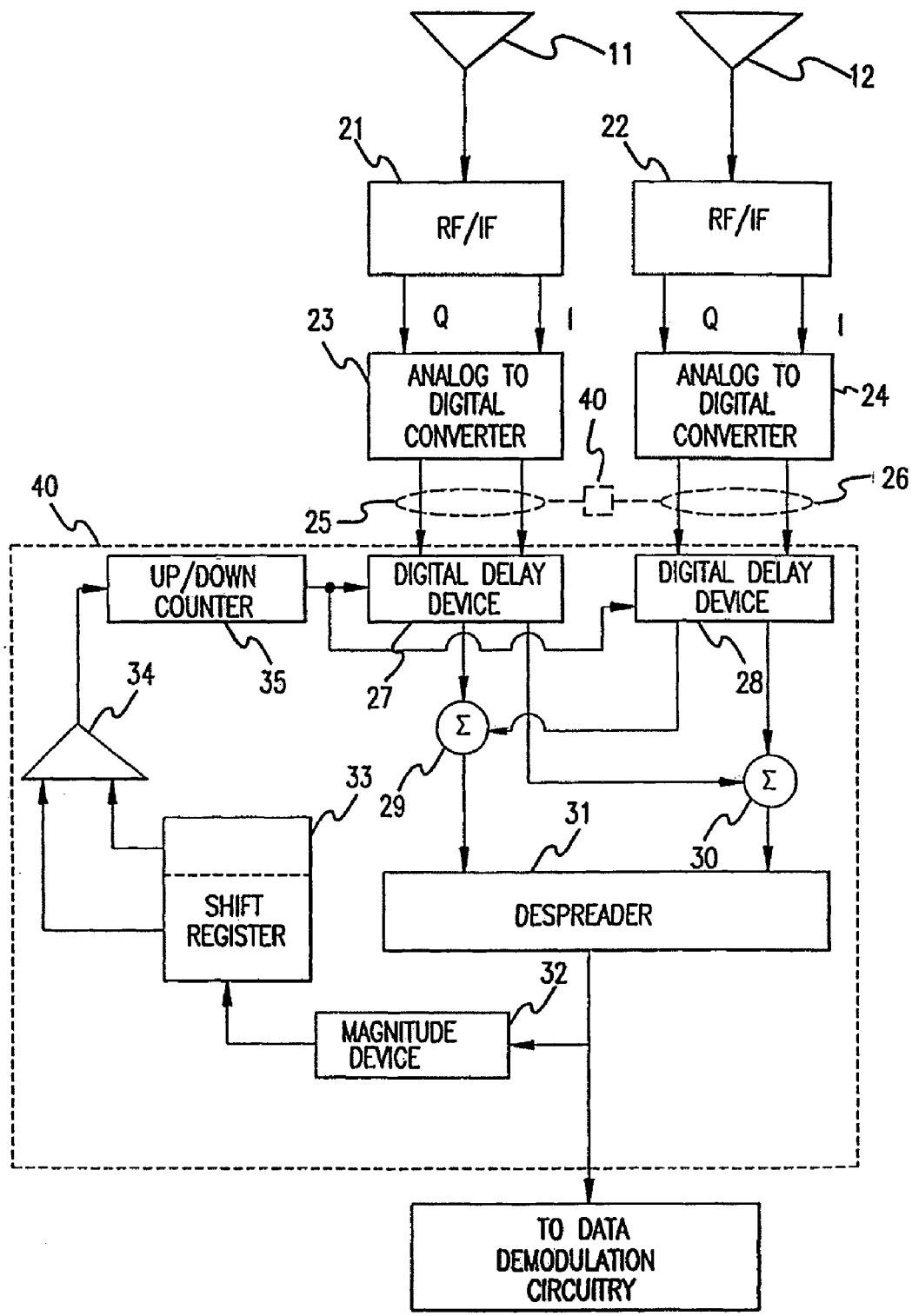
FIG. 3 is a block diagram for adjusting a phase between two receivers.

Reference now is made in detail to the present preferred embodiments of the invention, examples of which are illustrated in the accompanying drawings, wherein like reference numerals indicate like elements throughout the several views.

Handset

The present invention provides a unique phased array spread-spectrum system comprising receiving means, delaying means, combining means, despreading means, generating means, storing means, and comparing means. The delaying means is coupled between the receiving means and the combining means. The despreading means is coupled between the combining means and the generating means. The storing means is coupled between the generating means and the comparing means, and the comparing means is coupled to the delaying means.

The receiving means of FIG. 1 receives a spread-spectrum signal and a phased version of the spread-spectrum signal. The term "phased version" as used herein includes a version of the spread-spectrum signal having a phase different from the received spread-spectrum signal, and/or a version of the spread-spectrum signal having a time delay with respect to the received spread-spectrum signal. The different phase and/or time delay arises, as shown in FIG. 2, from the spread-spectrum signal 15 and the phased version of the spread-spectrum signal 16 arriving from different paths, such as bouncing off different buildings 17, 18. The phased array spread-spectrum system may be implemented at a base station or, as shown in FIG. 2, at a remote subscriber unit (RSU) such as a handset 19. The phase change occurs upon each reflection, since a first spread-spectrum signal 15 has one reflection and a second ray, such as the phased version of the spread-spectrum signal 16, has two reflections. As a result of the difference in time between the two signals, the multipath signals can undergo phase cancellation and cause a fade. The phased array spread-spectrum system of FIG. 1 delays or phase shifts one of the two antennas 11, 12 enough to steer the beam from the two antennas to either building, or ray path having maximum signal strength.

Typically, the receiving means, as shown in FIG. 1, includes a first antenna 11 and a second antenna 12. The spread-spectrum signal $d(t)g(t)\cos \omega_0 t$ is received with a first receiver coupled to the first antenna 11, and the phased version of the spread-spectrum signal $d(t-\tau)g(t-\tau)\cos \omega_0(t-\tau)$ is received with a second receiver coupled to the second antenna 12. The first receiver and the second receiver include radio frequency (RF) and intermediate frequency (IF) amplifiers and filters, as appropriate. The received spread-spectrum signal and the phased version of the spread-spectrum signal may be digitized.

The delaying means, shown in FIG. 1 as a delay device 13, can delay the received spread-spectrum signal with respect to the phased version of the spread-spectrum signal by a delay. The received spread-spectrum signal consequently becomes a delayed signal, with the delay approximately equal to a delay of the phased version of the spread-spectrum signal. A preferred embodiment employs digital signal processing. Accordingly, the delaying means would include a digital delay device such as a shift register. Alternatively, analog circuitry would employ an analog delay device, or a phase shifter.

Although illustrated with two antennas, the receiving means may include additional antennas for enhanced performance. The delaying means would have appropriate delaying circuits to accommodate the multiple antennas.

The combining means, shown in FIG. 1 as a combiner 14, combines the delayed signal and the phased version of the spread-spectrum signal as a combined signal. The delayed signal and the phased version of the spread-spectrum signal have approximately the same phase or time delay. Thus, an in-phase component of the delayed signal combines with an in-phase component of the phased version of the spread-spectrum signal, and a quadrature-phase component of the delayed signal combines with a quadrature-phase component of the phased version of the spread-spectrum signal.

The despreading means despreads the combined signal as a despread signal. This may be accomplished using a product detector with a chipping sequence matched to the received spread-spectrum signal, or a matched filter such as a surface acoustic wave (SAW) device having an impulse function matched to the chipping sequence of the received spread-spectrum signal. Product detectors, digital signal processors and SAW devices for despreading spread-spectrum signals are well known in the art.

The generating means generates a magnitude value from the despread signal. The magnitude value may be an absolute value, the square of the in-phase component and quadrature-phase component of the despread signal, or other metric of the despread signal for determining a relative signal strength value. A magnitude value currently being generated by the generating means is referred to herein as a present-magnitude value. A magnitude value previously generated by the generating means is referred to herein as a previous-magnitude value. The invention is taught with the previous-magnitude value being generated just before the present-magnitude value, although a previous-magnitude value may be separated in time and other magnitude values from the present magnitude value. Also, more than one previous-magnitude value may be used. The concept of the present invention is taught with one previous-magnitude value.

The storing means stores the previous-magnitude value previously generated by the generating means and the present-magnitude value presently generated by the generating means. In a digital implementation, the storing means might be embodied as a shift register or, equivalently, as gates for performing the storing function. In an analog implementation, the storing means might be embodied as two or more capacitors for storing the previous-magnitude value and the present-magnitude value.

The previous-magnitude value and the present-magnitude value are compared by the comparing means. In response to this comparison, the comparing means outputs a comparison signal. The comparing means, for example, may output a comparison signal to increase the delay $\tau$ of the delaying means, if the present-magnitude value were greater than the previous-magnitude value; conversely, the comparing means may output a comparison signal to decrease the delay $\tau$ of delaying means, if the present-magnitude value were less than the previous-magnitude value. The delaying means changes the first delay based on the comparison signal. If a plurality of previous-magnitude values were used, then a scheme may be implemented with the comparing means to weight the plurality of previous-magnitude values.

The present invention provides improvement if the delay $\tau$ is less than the time of a chip $T_c$. The present invention works on in-close multipath. For far-out multipath, noise is produced. Thus, the present invention finds applications in buildings or within areas where $\tau < T_c$. For $\tau > T_c$ a RAKE system should be used.

In the exemplary arrangement shown in FIG. 3, the receiving means is embodied as the first antenna 11, a first RF/IF section 21, a first analog-to-digital converter 23, the second antenna 12, a second RF/IF section 22, and a second analog-to-digital converter 24. The first RF/IF section 21 is coupled between the first antenna 11 and the first analog-to-digital converter 23. The second RF/IF section 22 is coupled between the second antenna 12 and the second analog-to-digital converter 24. Typically, the first RF/IF section 21 generates an in-phase component and a quadrature-phase component of the received spread-spectrum signal. The second RF/IF section 22 generates an in-phase component and quadrature-phase component of the phased-version of the spread-spectrum signal.

As illustratively shown in FIG. 3, the outputs of the first analog-to-digital converter 23 and the second analog-to-digital converter 24 may go to other sections 40 for processing different channels of the spread spectrum signal 25, 26.

The delaying means is embodied as a first digital delay device 27. The delaying means additionally may include a second digital delay device 28. The first digital delay device 27 is coupled to the first analog-to-digital converter 23. If a second digital delay device 28 were employed, then the second digital delay device 28 is coupled to the second analog-to-digital converter 24.

The combining means is embodied as a first summer 29 and a second summer 30. The first summer 29 is coupled to the first digital-delay device 27 and to the second digital-delay device 28. The second summer 30 is coupled to the first digital-delay device 27 and to the second digital-delay device 28. If the second digital delay device 28 were not employed, then the first summer 29 is coupled to the first digital-delay device 27 and to the second analog-to-digital converter 24, and the second summer 30 is coupled to the first digital-delay device 27 and to the second analog-to-digital converter 24.

The despreading means is embodied as a despreader 31. The despreader 31 may be embodied as a product device coupled to an appropriate chipping-sequence generator and synchronization circuitry for despreading the received spread spectrum signal. Alternatively, the despreader 31 may be a digital signal processor which includes the appropriate product devices, or a matched filter having an impulse response matched to the chipping sequence of the received spread spectrum signal. As is well known in the art, a surface acoustic wave (SAW) device having an impulse response matched to the chipping sequence may be employed.

The generating means is embodied as a magnitude device 32. The magnitude device 32 is coupled to the despreader 31. Normally, the despreader 31 is coupled to additional circuitry for demodulating data embedded in the received spread spectrum signal.

The storing means is embodied as a shift register 33. The shift register 33 is coupled to the magnitude device 32. The storing means alternatively may be embodied as a plurality of gates, registers, or other circuitry for storing magnitude values.

The comparing means may be embodied as a comparator 34 and an up/down counter 35. The comparator 34 typically has two inputs coupled to the shift register 33. The up/down counter 35 is coupled to the output of the comparator 34 and to the first digital-delay device 27 and/or the second digital-delay device 28.

The first antenna 11 receives the spread-spectrum signal which is amplified by the first RF/IF section 21. The first RF/IF section 21 outputs an in-phase component and a quadrature-phase component to the first analog-to-digital converter 23. The first analog-to-digital converter 23 converts the in-phase component and the quadrature-phase component to a digitized in-phase component and a digitized quadrature-phase component. These components may be processed by modules 40 similar to the phase compensation circuitry 40, by coupling to the outputs of the first analog-to-digital converter 23 at the outputs 25.

Similarly, a phased version of the spread-spectrum signal is received by the second antenna 12 and then amplified and filtered by the second RF/IF section 22. The second RF/IF section 22 has outputs for an in-phase component and a quadrature-phase component which are fed to the second analog-to-digital converter 24. The outputs 26 of the second analog-to-digital converter can go to modules 40 similar to the phase compensation circuitry 40 for processing different chipping sequences. For example, a spread spectrum signal may have a plurality of spread-spectrum channels, with each spread-spectrum channel defined by a different chipping sequence. Accordingly, each module 40 would be used for a corresponding spread-spectrum channel, for processing with that particular chipping sequence.

The first digital-delay device 27 delays the digitized spread-spectrum signal by a first delay. The output of the first digital-delay device 27 is the first delayed signal. The second digital-delay device 28 delays the digitized phased version of the spread-spectrum signal by a second delay. The output of the second digital-delay device 28 is a second delayed signal. The second digital-delay device 28 is optional, and is not required for use of the present invention. If the second digital-delay device 28 were not employed, then the term "second delayed signal" refers to the digitized phased version of the spread-spectrum signal, outputted from the second analog-to-digital converter 24.

The first summer 29 combines the quadrature-phase components of the first delayed signal from the first digital-delay device 27, with the quadrature-phase components of the second delayed signal from the second digital-delay device 28. The output of the first summer 29 is a first combined signal.

The second summer 30 combines an in-phase component from the first digital-delay device 27, with an in-phase component from the second digital-delay device 28. Accordingly, the in-phase components of the first delayed signal and the second delayed signal are combined as a second combined signal.

The despreading device 31 despreads the first combined signal and the second combined signal as a despread quadrature-phase signal and a despread in-phase signal, respectively. The despread in-phase signal and the despread quadrature-phase signal can be processed by further processing devices, not shown, for demodulating data embedded in the received spread-spectrum signal.

The magnitude device 32 generates a magnitude value from the despread in-phase signal and the despread quadrature-phase signal. The magnitude value may be an absolute value determined from the despread in-phase signal and the despread quadrature-phase signal, or a square of the despread in-phase signal plus a square of the despread quadrature-phase signal. Other metrics may be used for accomplishing the same function of determining a relative signal strength value. The function of the magnitude value is to compare the signal strength of a present-magnitude value with a previous-magnitude value. The shift register 33 stores the previous-magnitude value and the present-magnitude value in order that a comparison may be made by the comparator 34. The comparator 34, when comparing the previous-magnitude value with the present-magnitude value, outputs a comparison signal. The comparison signal can control the up/down counter 35 to increase or decrease a delay of the first digital-delay device 27. Optionally, the up/down counter 35 may increase or decrease a second delay of the second digital-delay device 28.

The present invention also includes a method for maximizing signal strength of a spread-spectrum signal with multipath comprising the steps of receiving the spread-spectrum signal and a phased version of the spread-spectrum signal. The in-phase and quadrature-phase components of the received spread-spectrum signal are delayed with respect to the in-phase and quadrature-phase components of the phased version of the spread-spectrum signal by a delay, to generate a delayed signal. The in-phase component and the quadrature-phase component of the delayed signal and the in-phase component and the quadrature-phase component of the phased version of the spread-spectrum signal are combined, respectively, as the in-phase component and quadrature-phase component of a combined signal, and the combined signal is despread as an in-phase component and a quadrature-phase component of a despread signal.

The method includes generating a magnitude value from the in-phase component and the quadrature-phase component of the despread signal, and storing a previous-magnitude value and a present-magnitude value. The previous-magnitude value and the present-magnitude value are compared, and a comparison signal is output based on this comparison. Using the comparison signal, the delay is changed.

Base Station

Figure 4:
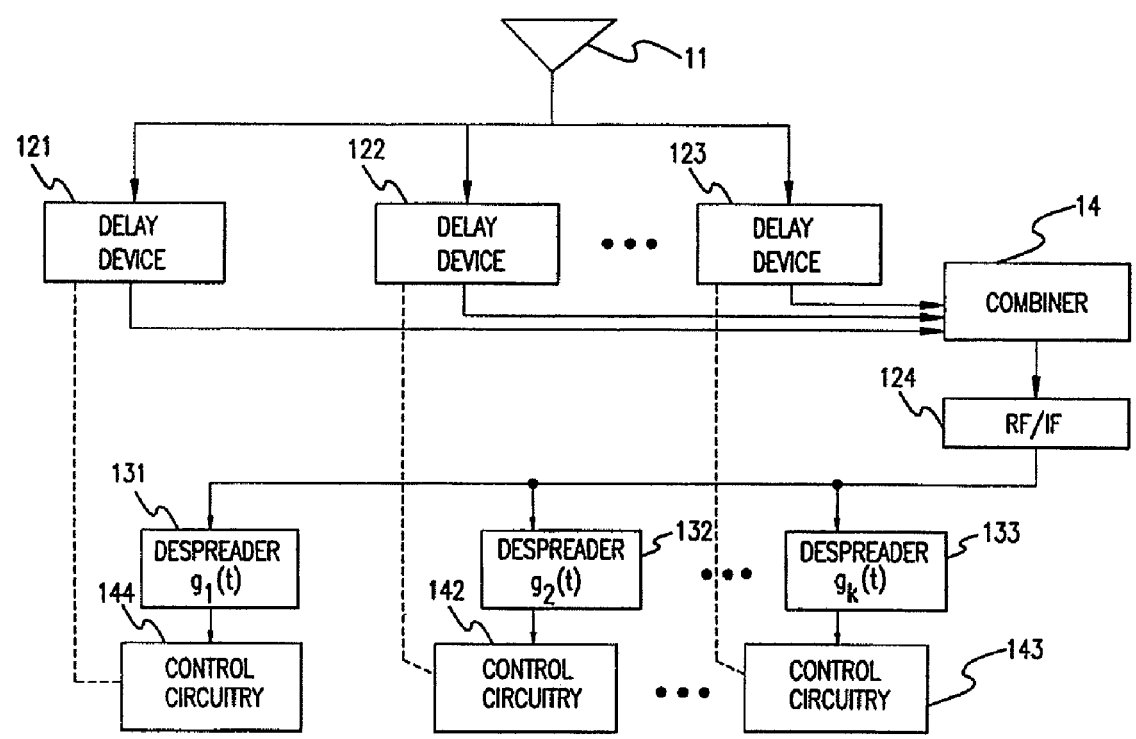
FIG. 4 is a block diagram for adjusting a phase for a plurality of spread-spectrum signals.
Figure 5:
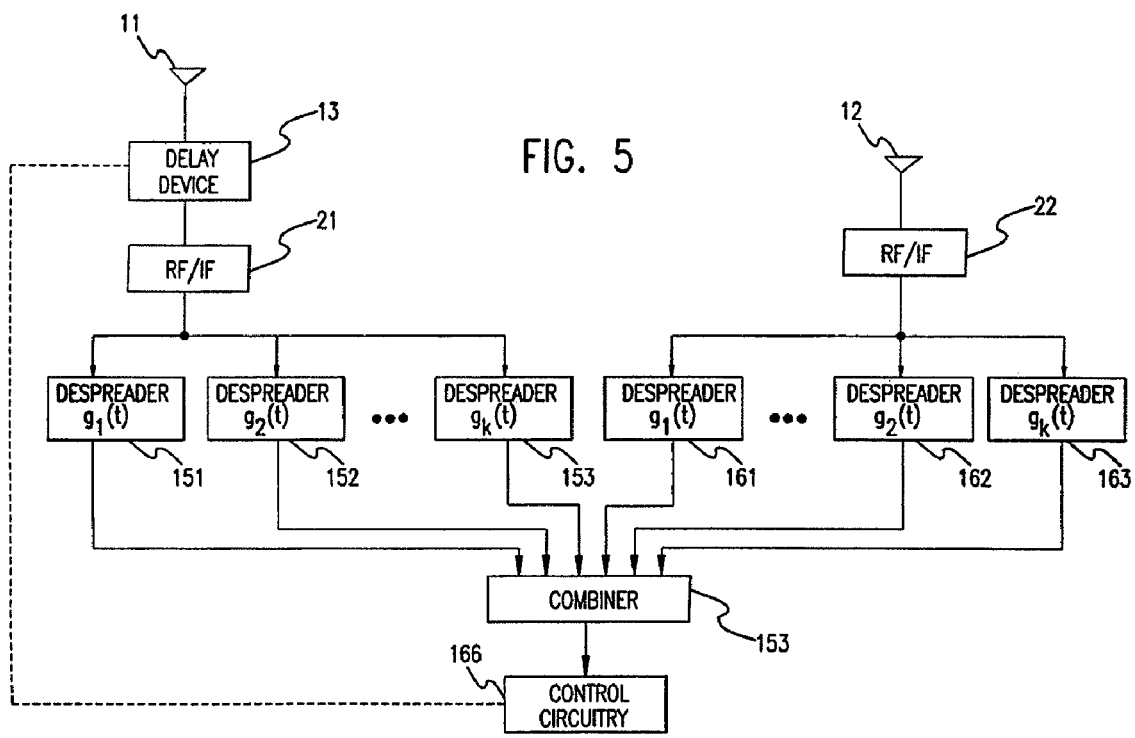
FIG. 5 is a block diagram for adjusting a phase between two sets of receivers for a plurality of spread-spectrum signals.

The present invention may be extended to the base station, with the unique phased array spread-spectrum system processing a plurality of spread-spectrum signals. In this embodiment, the receiving means receive a plurality of spread-spectrum signals and a plurality of phased versions of the plurality of spread-spectrum signals. As shown in FIG. 2, the different phases and/or time delays arise from the spread-spectrum signal 15 and the phased version of the spread-spectrum signal 16 arriving from different paths, such as bouncing off different buildings 17, 18. Typically, the receiving means, as shown in FIGS. 3, 4, and 5, includes the first antenna 11 and second antenna 12. The receiving means may further include appropriate RF and IF amplifiers and filters. The received plurality of spread-spectrum signals and the received plurality of phased versions of the plurality of spread-spectrum signals may be digitized.

The delaying means, shown in FIG. 4 as delay device 121, delay device 122, . . . , delay device 123, can delay the received plurality of spread-spectrum signals, with respect to the received plurality of phased versions of the plurality of spread-spectrum signals, by a plurality of delays, respectively. The received plurality of spread-spectrum signals consequently become a plurality of delayed signals, with the delay for each of the plurality of delayed signals approximately equal to a delay of the respective phased version of the received spread-spectrum signal. A preferred embodiment would include digital signal processing. Accordingly, the delay means would include a digital delay device such as a shift register. Alternatively, analog circuitry would employ an analog delay device, or phase shifter.

The combining means, shown in FIG. 4 as a combiner 14, combines the plurality of delayed signals and the plurality of phased versions of the plurality of spread-spectrum signals as a combined signal. The output of the combining means may include appropriate RF circuitry and/or IF circuitry 124.

Each of the plurality of the delayed signals, and each of the respective phased versions of the plurality of spread-spectrum signals, respectively, have the same phase or time delay. Thus, an in-phase component of the delayed signal combines with an in-phase component of the phased version of a spread-spectrum signal, and a quadrature-phase component of the delayed signal combines with a quadrature-phase component of the phased version of the spread-spectrum signal.

The despreading means despreads the combined signal as a plurality of despread signals. This may be accomplished, as shown in FIG. 4, using a plurality of despreading devices, 131, 132, ..., 133. Each despreading device may be implemented using a product detector or mixer with a chipping sequence matched to the received spread-spectrum signal for a particular channel. Alternatively, the despreader may be implemented using a matched filter, such as surface acoustic wave device, having an impulse function matched to the chipping sequence of the received spread-spectrum signal for the particular channel. Product detectors, mixers, digital signal processors and SAW devices for despreading spread-spectrum signal are well known in the art.

The controller means changes the plurality of delays of the delay means, in response to the plurality of despread signals. The controlling means, as illustrated in FIG. 4, is embodied as a plurality of control circuitry 141, 142, ..., 143. The controlling means outputs a plurality of comparison signals to the plurality of delay devices 121, 122, ..., 123.

The controlling means may include generating means, storing means, and comparing means. The generating means can generate a plurality of magnitude values from the plurality of despread signals. The storing means stores a plurality of previous-magnitude values and a plurality of present-magnitude values generated by the generating means. The comparing means compares the plurality of previous-magnitude values with the plurality of present-magnitude values, and outputs a plurality of comparison signals. An embodiment of the generating means storing means and comparing means is illustrated in FIG. 3.

In response to the plurality of comparison signals, the delay means changes the plurality of delays, respectively. FIG. 4 broadly illustrates how the control circuitry 141, 142, ..., 143 is coupled to the delay device 121, 122, ..., 123, respectively. As apparent to one skilled in the art, the control circuitry shown in FIG. 4 may be implemented using circuitry in FIG. 3 for each spread spectrum channel.

FIG. 5 illustrates an alternative embodiment, with a signal delay device 13 coupled to the antenna 11. Also shown is an RF/IF amplifier 21 coupled through the delay device 13 to the antenna 11, and an RF/IF amplifier 22 coupled to the antenna 12. In FIG. 5 each spread spectrum channel, defined by chipping sequences $g_1(t), g_2(t), \ldots, g_k(t)$, is despread by the plurality of despreaders 151, 152, ..., 153 for the plurality of spread-spectrum channels. Similarly, the plurality of phased versions of the plurality of spread-spectrum channels are despread by the plurality of despreaders 161, 162, ..., 163, using chipping sequences $g_1(t), g_2(t), \ldots, g_k(t)$.

The delay device 13 delays the plurality of spread-spectrum signals with respect to the received plurality of phased versions of the plurality of spread-spectrum signals by a delay, thereby generating the plurality of delayed signals.

The combiner 153 combines the plurality of delayed signals and the plurality of phased versions of the spread-spectrum signals as a combined signal. In response to the combined signal, the control circuitry 166 changes the delay of the delay device 13.

In use, the phased array spread-spectrum system and method may be used at a base station or a remote unit. A spread-spectrum signal being received by the phased array spread spectrum system and method is received by the first antenna 11 and the second antenna 12, processed by the first and second RF/IF sections 21, 22, and converted to a digital form by first analog-to-digital converter 23 and second analog-to-digital converter 24. Preferably, digital signal processing is used and may be embodied in an application-specific integrated circuit (ASIC). The digitized spread-spectrum signal from the first analog-to-digital converter 23 is preferably delayed with respect to the digitized phased version of the spread-spectrum signal from the second analog-to-digital converter 24. The first digital-delay device 27 is adjusted by an up/down counter 35 until the phase and/or time delay between the digitized spread-spectrum signal, and the digitized phased version of the spread-spectrum signal, are more closely aligned. The alignment accrues due to the variations of the up/down counter 35 in response to comparisons by the comparator 34 of a present-magnitude value and a previous-magnitude value stored in register 33.

Thus, the spread-spectrum signal and a phased version of the spread-spectrum signal are received, processed to an intermediate frequency or base band, and digitized. In-phase and quadrature-phase components are used and delayed and added. The resulting in-phase component and quadrature-phase component are then despread. The magnitude of the despread spread-spectrum signal is then taken; this represents the power or signal strength of the desired signal. The present-magnitude value and the previous-magnitude value are input to the shift register 33 and compared by the comparator 34. The comparator 34 tells the up/down counter 35 to count as an increase or decrease, i.e., up or down, thereby controlling the delay. Thus, an increase in count might increase the delay, whereas a decrease in count would decrease the delay. Various control algorithms may be used with the up/down counter 35, for more efficiency.

The phased array spread-spectrum system steers an antenna beam formed by the first antenna 11 and the second antenna 12 in the direction of the strongest multipath. This function can be performed continually, so as to be continually looking for the optimal multipath. This beam steering can be done at a base station and at a handset, i.e., a remote subscriber unit.

It will be apparent to those skilled in the art that various modifications can be made to the base station phased array spread spectrum system and method of the instant invention without departing from the scope or spirit of the invention, and it is intended that the present invention cover modifications and variations of the base station phased array spread spectrum system and method provided they come within the scope of the appended claims and their equivalents.

What is claimed is:

1. A spread spectrum base station comprising:
   a set of phased array antennas for receiving a spread spectrum signal containing a plurality of channels;
   at least one delay device for outputting at least one timed version of the received signal, each timed version associated with one of the phased array antennas;
   a despreader for producing a plurality of despread signals by despreading the at least one timed version of the received signal using chip code sequences associated with the plurality of channels;

a combiner configured to combine the despread signals to form a combined despread signal; and a counter for adjusting a delay associated with the at least one timed version of the received signal based on a change in magnitude of the combined despread signal such that antenna beams associated with the set of phased array antennas are steered towards components of the spread spectrum signal with a highest combined magnitude.

2. The base station of claim 1, wherein the counter further comprises:

a magnitude device for determining a magnitude of the combined despread signal for obtaining a present and a prior magnitude.

3. The base station of claim 1, wherein the counter further comprises:

a comparator for comparing the present magnitude with the prior magnitude.

4. The base station of claim 1, further comprising:

a plurality of analog-to-digital converters.

5. The base station of claim 1, wherein the counter uses control algorithms to control the delay.

6. The base station of claim 5, wherein the control algorithms is varied to increase efficiency.

7. The base station of claim 1, wherein the despreader is implemented using a product detector with a chipping sequence matched to the plurality of timed versions of the received spread spectrum signal for a particular channel.

8. The base station of claim 1, wherein the despreader is implemented using a mixer with a chipping sequence matched to the plurality of timed versions of the received spread spectrum signal for a particular channel.

9. The base station of claim 1, wherein the despreader is implemented using a matched filter, including a surface acoustic wave device, having an impulse function matched to the chipping sequence of the plurality of timed versions of the received spread spectrum signal for the particular channel.

* * * * *